Oct. 29, 1935.　　　J. FERGUSON　　　2,018,883
METHOD AND APPARATUS FOR MELTING MATERIAL IN AN ELECTRIC FURNACE
Filed Nov. 2, 1933
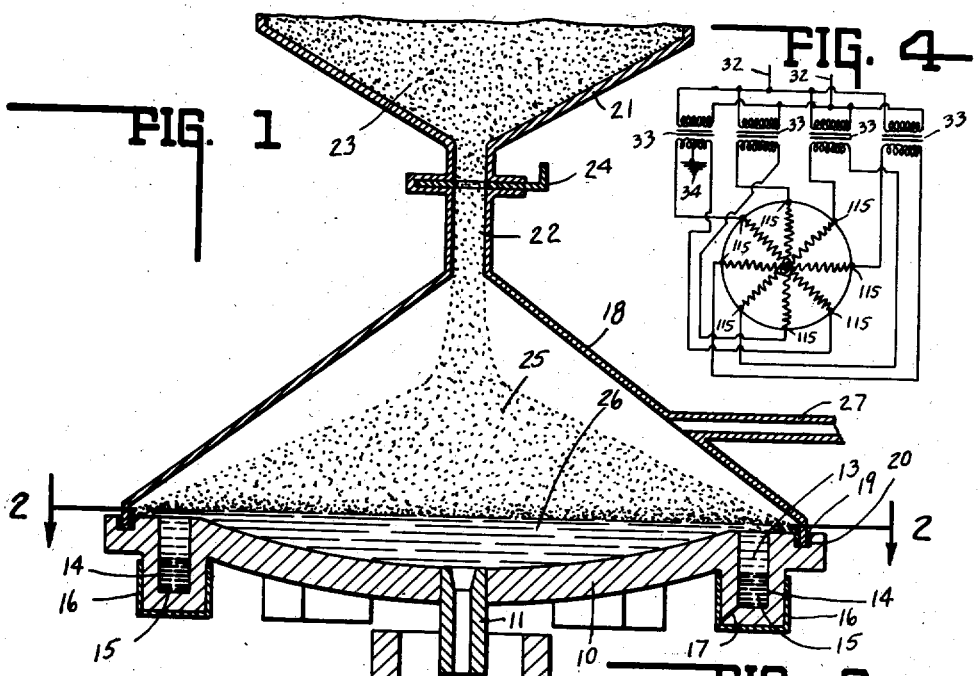
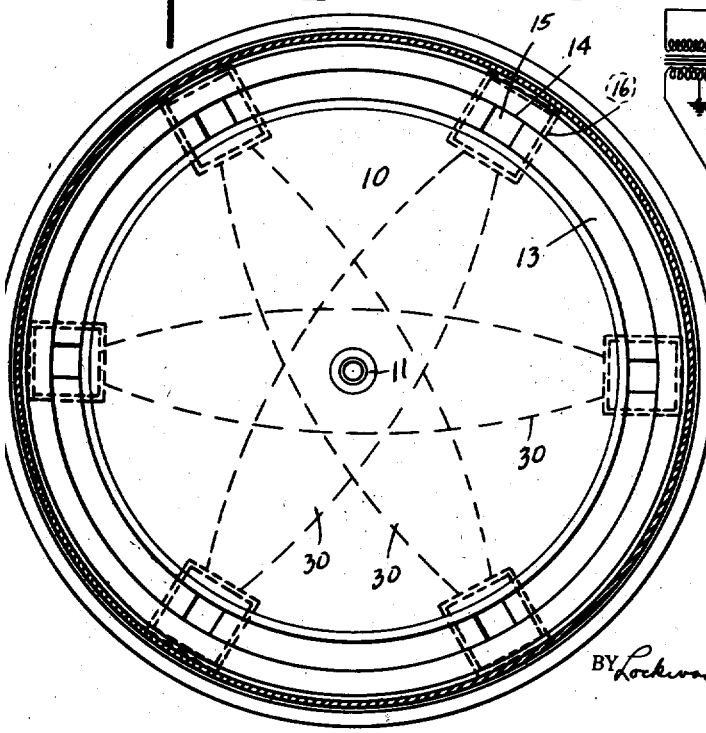
INVENTOR.
JOHN FERGUSON.
BY Lockwood Goldsmith & Galt
ATTORNEYS.

Patented Oct. 29, 1935

2,018,883

UNITED STATES PATENT OFFICE 2,018,883

METHOD AND APPARATUS FOR MELTING MATERIAL IN AN ELECTRIC FURNACE

John Ferguson, Indianapolis, Ind., assignor to Fairmount Glass Works, Inc., Indianapolis, Ind., a corporation Application November 2, 1933, Serial No. 696,373

6 Claims. (Cl. 13—6)

This invention relates to a method and apparatus for melting material in an electric furnace in which glass or other vitreous or refractory substances which are conductors of electricity at high temperatures may be fused. It is particularly useful for the melting of the materials forming the batch mixture for glass manufacture.

One of the principal difficulties with electric furnaces for melting such substances at relatively high temperatures has been the necessity for frequent replacement of the refractory lining of the furnace. In processes such as the manufacture of glass the deterioration of the lining is due to chemical action at the "metal line", or line dividing the molten glass and unmelted batch. At this point there is a rather violent chemical reaction, the products of which attack the lining of the furnace in contact with the metal line and cause a very rapid disintegration thereof.

One object of the present invention is to prevent rapid deterioration of the refractory lining of the furnace by localizing the zone of greatest temperature and greatest chemical action at a point in the furnace remote from the refractory lining thereof.

One feature of the invention by which the said object is obtained resides in the confining of the electric currents through the furnace to a plurality of relatively narrow paths which intersect at a point remote from the periphery of the furnace. At the point of intersection, therefore, the concentration of current is the greatest and, consequently, the heat generated adjacent thereto is sufficient to produce much higher temperatures than in other parts of the furnace. The contents of the furnace around the periphery thereof is maintained at a sufficiently low temperature to prevent active chemical action with the refractory lining and rapid deterioration thereof. When applied to a glass furnace, the temperature at the periphery may be sufficiently low to maintain the glass or batch materials in an unmelted condition. No refractory side walls, therefore, are necessary, the solid glass or batch material providing retaining means for the molten glass in the interior of the furnace. Even when such a side wall is used, there is no contact whatever between the refractory lining and the molten glass at the metal line where the most violent chemical action takes place.

Another object of the invention is to preserve the electrodes from the effects of the high temperatures involved. To this end, the electrodes are placed in the cooler peripheral zone of minimum current and heat concentration. This may permit the use of certain types of electrodes where the maximum furnace temperature is greater than the boiling point of the electrode material. For example, molten lead electrodes may be used in the melting of materials having a fusion point higher than the boiling point of lead, since the fusing temperatures are driven to and concentrated at a distance from the electrodes.

A feature of the invention resides in the repellant interaction between electrically charged particles in the several current paths as they converge toward the center of the furnace. This interaction, particularly when associated with the dish-shaped bottom of the furnace sloping from the outer portions to a central zone of maximum depth, produces a turbulent or rotative motion to the mass of material which promotes the homogeneity thereof.

A further feature resides in the provision of a discharge orifice in the central zone of the furnace, preferably at the point of maximum depth and maintaining a maximum temperature and fluidity of the molten material immediately above the orifice to facilitate feeding therethrough.

Other objects and features of the invention will be understood from the accompanying drawing and the following description and claims:

Fig. 1 is a central sectional view of a glass furnace embodying the invention. Fig. 2 is a sectional plan view taken on the line 2—2 of Fig. 1. Fig. 3 is a diagram of the wiring connections showing a preferred form thereof for furnishing electric current to the furnace. Fig. 4 is a diagram of an alternative form of wiring.

The glass furnace shown in the drawings by way of illustration is substantially circular in form and is provided with a refractory floor 10 having a saucer like form depressed at the center. A discharge opening 11 is fitted at the center of the floor 10 through which molten material may be discharged or fed in any suitable manner as is well known in the art, a receptacle 12 being herein illustrated for its reception. About the periphery of the furnace there is formed a circular trough 13 provided at intervals with wells 14 lined with refractory material and containing electrodes 15 of any suitable material, such as molten lead. Each of the wells 14 is surrounded by a metallic box 16 having electric connection with the electrode 15 by means of a passage 17 within the refractory lining, the electrical connections for the current supply being attached to the boxes 16.

For illustration, the furnace may be covered by a hood 18 with its lower peripheral edge imbedded in an annular slot 19 in which there is provided a suitable sealing material 20. A hopper 21 may be positioned above the hood 18 and connected thereto by a feed conduit 22. The hopper is adapted to carry a supply 23 of the glass batch material, the flow of which is controlled through the passage 22 by means of a gate 24. Preferably, sufficient batch is maintained in the furnace to provide a conical pile 25 above the molten glass 26 in the furnace. If desired, the gate 24 may be dispensed with and the batch feed accomplished as illustrated in copending application, Serial No. 697,565, filed November 11, 1933, entitled Electric glass furnace. The hood 18 is provided with a conduit 27 connected to any suitable pressure regulating device by means of which the pressure within the hood may be varied to control the feed of glass through outlet 11, as described and claimed in the above-mentioned co-pending application. If desired, the pressure control may be such as to provide "gob" feed rather than continuous flow, in which case the receptacle 12 illustrated herein is replaced by the conventional shearing mechanism.

In Fig. 3 there are shown three power mains of a three-phase alternating current supply, indicated by the numeral 28. Said power mains are delta or star connected to the primary windings of three transformers 29. Each of the secondary windings of the three transformers, however, is independently connected to a pair of the electrodes 15, the electrodes of each pair being positioned on opposite sides of the furnace. The secondary circuits are not electrically connected at any point exterior of the furnace, and therefore, the only currents passing through the glass are the diametrical currents passing between the two electrodes of each pair. If the secondary circuits were conductively connected outside the furnace, there would also be currents passing between adjacent electrodes. Because of the fact that glass is an unstable resistor whose resistivity decreases as the temperature increases, the currents between the electrodes tend to follow the paths heated by said currents and are, therefore, confined to the relatively narrow paths indicated by broken lines 30 in Fig. 2. For safety, the mid-point of one of the secondary transformer windings may be grounded as shown at 31 to maintain the central part of the furnace at zero potential and prevent accumulation of static charges thereon. Only one such ground connection may be used without destroying the desired concentration of current at the intersecting current paths.

The paths of the electrodes intersect at the central zone of the furnace and thus concentrate the greatest amount of heat therein. The concentration of heat decreases toward the periphery to such an extent that in the peripheral zone the temperature may be maintained at such a low degree that substantial melting of the glass is prevented while the center of the furnace is sufficiently hot to melt the batch and maintain the glass at the proper degree of fluidity. For that reason no refractory side walls are required, and even if such walls are supplied, the metal line or zone of violent chemical action does not extend outward sufficiently far to make contact therewith.

If the furnace were constructed of uniform depth, the difference in temperature between the central zone and the outer zone would be greater than desired for proper functioning of the glass furnace since the cross sectional area per unit of current decreases very rapidly toward the center. By constructing the furnace with a greater depth at the center, a larger cross section of current path is provided at the center so that the concentration of heat may be lessened sufficiently to give the desired temperature difference between the outer and inner zones of material. For glass manufacture, the central zone should be maintained from 500° to 600° F. above the temperature of the peripheral zone and this temperature difference may be readily secured by proper proportioning of the relative central and peripheral depths of the furnace. For other materials than glass, other temperature differences may be secured by proper proportioning of the furnace depths.

Another advantage of the intersecting diametrical current paths lies in the attractive and repellant interaction between the electrically charged particles in the several current paths as they converge toward the center of the furnace. This interaction produces forces tending to give a certain degree of turbulent or rotative motion to the mass of material adjacent the discharge opening. The said motion is valuable in promoting the homogeneity of the material discharged therefrom.

In Fig. 4 there is illustrated an alternative form of wiring in which four pairs of electrodes are used and current is supplied from a single phase instead of a three-phase power source. In this diagram, the two power mains of a single phase alternating current supply are indicated by the numerals 32. The primary windings of four transformers 33 are connected in multiple across said mains while the secondary windings of said transformers are each connected to a pair of oppositely positioned electrodes 115. The midpoint of one of the secondary windings is grounded as shown at 34. By means of this arrangement, a larger number of current paths are provided than by that previously described so that a larger furnace may be properly operated with the same concentration of current and heat at the center of the furnace.

It is obvious that as many diametrical current paths as required may be furnished by the use of additional transformers and electrodes. For smaller furnaces only two such current paths may be required and these may be supplied from a single phase source as just described, or from a two-phase source if desired. For the heating of materials where no undesirable electrolytic action is possible, direct current may be used but the direct current circuits must be isolated outside of the furnace in the same manner as the alternating circuits herein described. Because of the relative ease of isolating alternating currents by means of transformer connections, the alternating currents are preferable.

While the invention has been specifically described, by way of example, as applied to a glass furnace, such description is not to be taken as limiting the invention thereto nor to the details herein shown. Many modifications thereof within the scope of the appended claims will suggest themselves to those skilled in the art. For example, the character of the turbulent motion of the material may be modified by using currents of different frequencies in the various paths, by using alternating currents in certain paths and ...ct current in others, or by variations in the ...rity of the currents either with direct or al...ating currents.

The invention claimed is:

1. In combination, an electric furnace, means passing a plurality of independent electric currents through the contents thereof, said currents being substantially confined to diametrical ...s, and the depth of said furnace adjacent the ...rsection of said current paths being greater ...n that at the periphery thereof.

2. In combination, an electric furnace, means passing a plurality of independent electric currents through the contents thereof, said currents being substantially confined to diametrical ...hs, and the depth of said furnace increasing progressively from the periphery toward the ...ter thereof.

3. An electric glass melting and refining furnace for receiving batch material to be melted therein, including a shallow dish-shaped hearth ...ring a central discharge opening, said hearth ...ping from an outer zone of minimum depth ...a central zone of greater depth adjacent said ...charge opening, and means for passing a ...rality of independent electric currents through ...contents of said furnace, said currents being ...stantially confined to diametrical paths intersecting in the deeper portion of said furnace adjacent said discharge opening.

4. An electric glass melting and refining furnace for receiving batch material to be melted ...rein including a refractory hearth floor, a ...rality of spaced electrodes positioned inwardly ...m the outer edge of said floor and in electric contact with molten glass therein, means for passing electric currents between said electrodes through the material on said floor, and means for feeding batch material into said furnace so as to embrace the peripheral portion of the molten glass by contacting and resting upon the outer portion of the hearth floor, whereby the molten glass will be completely retained by the hearth floor and the surrounding batch material.

5. An electric glass melting and refining furnace for receiving batch material to be melted therein, having a dish-shaped bottom sloping from an outer peripheral portion of minimum depth to a central zone of greater depth, a discharge orifice in the central zone of the furnace bottom, a plurality of spaced electrodes about the outer peripheral portion in direct contact with the molten glass, a source of energy connected with said electrodes causing an electric current to pass through the molten glass, and means for feeding the batch material onto the upper surface of the molten glass so as to cover the surface thereof and embrace the peripheral portion of the molten glass by contacting and resting upon the outer portion of the furnace floor whereby the molten glass will be completely enveloped by the furnace floor and the superposed batch material.

6. A method of melting and refining glass consisting in supporting molten glass in a thin layer upon a dish-shaped furnace floor, causing an electric current to pass transversely through the glass, and entirely surrounding the exposed surface of the molten glass with glass making batch material.

JOHN FERGUSON.